United States Patent [19]

Lambert

[11] Patent Number: 4,779,820
[45] Date of Patent: Oct. 25, 1988

[54] FLEXIBLE CONTROL SURFACE DRIVE FOR FOLDING WING AIRCRAFT

[75] Inventor: Neville L. Lambert, King County, Wash.

[73] Assignee: The Boeing Company, Seattle, Wash.

[21] Appl. No.: 116,631

[22] Filed: Nov. 2, 1987

[51] Int. Cl.⁴ .............................................. B64C 3/56
[52] U.S. Cl. ........................................................ 244/49
[58] Field of Search ............... 244/49, 90 R, 213, 214, 244/215, 75 R

[56] References Cited

U.S. PATENT DOCUMENTS

| | | | |
|---|---|---|---|
| 1,928,336 | 9/1933 | Kindelberger | 244/49 |
| 2,861,758 | 11/1958 | Howard | 244/90 R |
| 3,173,629 | 3/1965 | Uhor | 244/49 |
| 4,256,277 | 3/1981 | Embree | 244/213 |
| 4,284,254 | 8/1981 | Rieben | 244/75 R |

FOREIGN PATENT DOCUMENTS

| | | | |
|---|---|---|---|
| 76836 | 6/1919 | Fed. Rep. of Germany | 244/22 |
| 475433 | 12/1937 | United Kingdom | 244/49 |

Primary Examiner—Galen Barefoot
Assistant Examiner—R. A. Corl
Attorney, Agent, or Firm—Seed and Berry

[57] ABSTRACT

A flexible rotary coupling is provided to transfer rotary power across the wingfold access of a folding wing aircraft. The flexible rotary coupling has a step-up gear box on the inboard wing section to increase the rotational velocity of the flexible coupling. The outboard wing section has a step-down gear box to decrease the rotational velocity of the flexible coupling to that of the step-up gear box input. In this way, substantial rotational power can be transferred across the wingfold axis through the flexible coupling axis with a thin, highly flexible shaft. A guide mechanism is provided to store excess shaft length when the wing is in the unfolded (i.e., straight) position.

19 Claims, 2 Drawing Sheets

FLEXIBLE CONTROL SURFACE DRIVE FOR FOLDING WING AIRCRAFT

DESCRIPTION

Statement of Government Interest

This invention was made with government support under Contract No. N00019-85-C-0311 awarded by the U.S. Navy. The government has certain rights in this invention.

TECHNICAL FIELD

This invention relates to drive mechanisms for control surfaces on folding wing aircraft. More specifically, the invention relates to apparatus for transmitting rotary power across the wing fold axis of folding wing aircraft at the wing leading edge for actuation of high lift control surfaces.

BACKGROUND ART

Folding wing aircraft have found particular utility for service aboard aircraft carriers. Such aircraft typically have inboard wing sections which are pivotally connected to outboard wing sections. The outboard wing sections are thus foldable with respect to the inboard wing sections, reducing the surface area required to stow the aircraft aboard a vessel. The wing fold axis is typically aligned with the fuselage of the aircraft and transverse to the axis of the wing.

Airflow control surfaces are generally present on the foldable wings. For example, the wings have flight control surfaces, such as ailerons, and high lift control surfaces, such as leading edge slats and trailing edge flaps. These control surfaces traverse the wing fold axis so that the control surfaces are divided into inboard and outboard control surface sections. Mechanisms are provided to drive these surfaces across the wing fold axis.

Among modern folding wing aircraft, leading edge slats are typically connected to the wing by tracks which guide the slats and flaps along controlled paths. The slats (hereinafter referred to as control surfaces) are deiven by ball screw actuators or other devices, such as rotary geared power hinges, located at various points along the wing. The ball screw actuators require a rotary input to move the control surfaces. Thus, torque tubes are provided in the interior of the wing to transmit torque from a fuselage-mounted gear box through the inboard wing section and across the wing fold axis to the outboard wing section.

The torque tubes are typically transverse to and displaced from the wing fold axis. Universal joints are often provided wherever a torque tube intersects a wing rib so that flexure of the wing does not bind the drive system. At the wing fold axis, a particular geometric problem is encountered because the drive axis, defined by the torque tubes, is both displaced from, and often an angle of more than 90° relative to, the wing fold axis. Furthermore, the angle with which the outboard wing section is pivotable with respect to the inboard wing section is often more than 90°. Thus, the outboard torque tube becomes displaced from the inboard torque tube through a compound motion.

As stated above, mechanisms are presently employed to transmit torque across the wing fold axis from the inboard wing section to the outboard section. One mechanism utilizes a wing fold gearbox having a dog clutch. The dog clutch has a plurality of interlocking fingers which engage one another when the wing is unfolded (i.e., wings spread). When the wing is folded, the fingers disengage one another. Thus, the inboard torque tubes are disengaged from the outboard torque tubes. While this system permits torque to be transmitted across the wing fold axis when the wings are spread, the control surfaces cannot be operated when the wings are folded. This is particularly disadvantageous when maintenance is required on the control surface systems. Furthermore, it is possible for a mechanic to manually engage the fingers of the dog clutch on the outboard wing section when the wings are folded with a wrench or other implement, possibly placing the inboard and outboard control surfaces out of synchronization when the wings are unfolded.

Therefore, a need exits for a system which can transmit torque across a wing fold axis on folding wing aircraft which is highly reliable, light in weight and which can transmit torque across the wing fold axis while the wings are folded or being folded.

DISCLOSURE OF THE INVENTION

It is an object of the present invention to provide an apparatus which can transmit torque across the wing fold axis of a folding wing aircraft while the wings are folded and while the wings are being folded.

The invention achieves the above object, and other objects and advantages which will become apparent from the description which follows, by providing a flexible rotary coupling for transmitting power across a wing fold axis of a folding wing aircraft. The coupling has a flexible shaft which transmits rotary motion from an inboard torque tube on the inboard wing section to an outboard torque tube on the outboard wing section. A step-up transmission is provided at the output of the inboard torque tube to step up the rotational speed of the flexible shaft. The outboard wing section has a step-down transmission which reduces the rotational velocity of the flexible shaft to that of the inboard torque tube. In this way, substantial rotary power can be transmitted across the wing fold axis at low torque with a relatively thin flexible shaft. A thin shaft is desirable because the shaft diameter and the flexibility of the shaft are inversely related.

In the preferred embodiment of the invention, the gear ratios of the step-up and step-down transmission are reciprocal. Thus, the outboard torque tube rotates at the same velocity as the inboard torque tube. The inboard section of the wing is provided with a curved fairlead which maintains a minimum radius of curvature for the flexible cable when the wing is folded. A guide mechanism is also provided to support excess cable length which must be accommodated when the wings are in an unfolded (i.e. straight) condition.

BEST MODE FOR CARRYING OUT THE INVENTION

Figure 1:
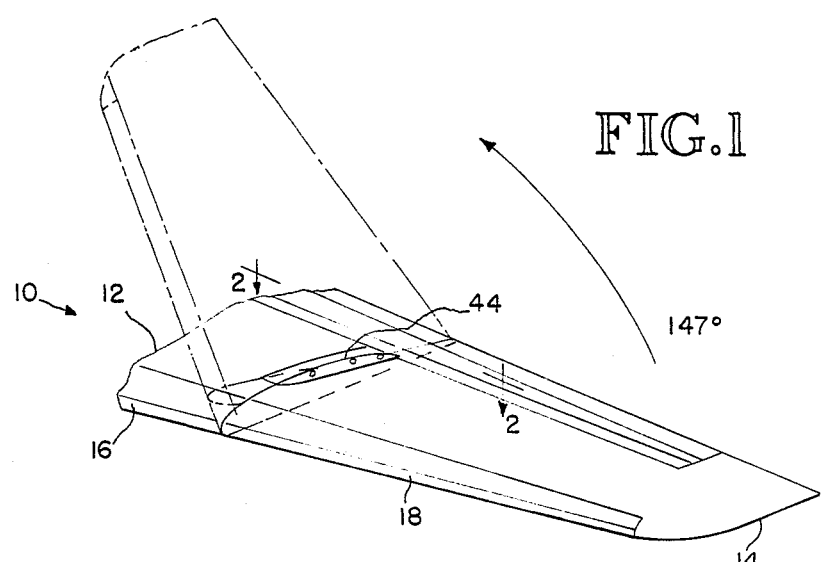
FIG. 1 is an isometric view of a folding wing utilizing the flexible coupling of the present invention to couple inboard and outboard leading edge slats on the aircraft.

A conventional folding aircraft wing, generally indicated at reference numeral 10, is shown in FIG. 1. The wing has inboard sections 12, pivotally connected to outboard sections 14. The outboard wing section is shown in a fully folded position in phantom.

The wing 10 has an inboard leading edge slat 16 which is operated synchronously with an outboard leading edge slat 18. The slat 16, 18 are connected to helical ball screws which are driven by ball screw actuators 28. The ball screw actuators 28 are driven by elongated torque tubes each of which has an inboard torque tube 32 and an outboard torque tube 34 defining a torque tube drive system. The inboard torque tube is driven by a fuselage-mounted gear box (not shown) which is controlled by the pilot.

Figure 2:
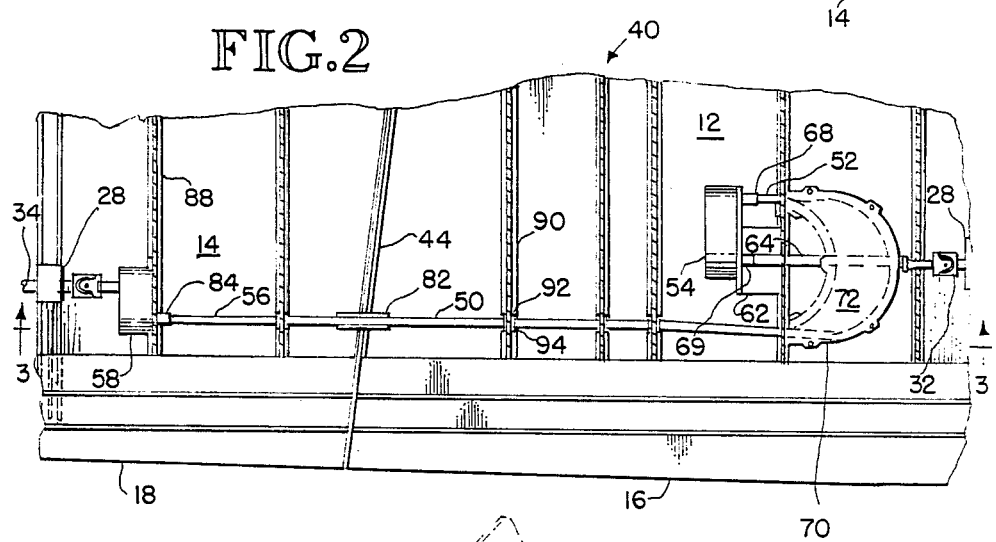
FIG. 2 is a partial, sectional, top plan view of the rotary coupling taken in the general direction of line 2—2 in FIG. 1.

A flexible rotary coupling, in accordance with the present invention, is generally indicated at reference numeral 40 in FIG. 2. The coupling transmits rotary power across a wing fold axis 44 between the inboard torque tube 32 and outboard torque tube 34. The coupling is shown installed on a folding wing similar to the folding wing of the Grumman A-6F Naval Aircraft. In this aircraft, the wing fold axis 44 is displaced from an axis defined by the torque tube drive system by approximately 117°. Furthermore, the outboard wing section 14 in the fold position is pivoted approximately 147° relative to its position in the wing unfolded position. Thus, the flexible rotary coupling must be capable of transmitting rotary power from the inboard torque tube 32 to the outboard torque tube 34 at angles greater than 90 degrees and while undergoing a complex, compound motion. For this reason, a highly flexible rotary coupling is desired which can also transmit substantial rotary power across the wing fold axis 44.

In order to achieve the above, the flexible rotary coupling 40 is provided with a relatively thin flexible shaft 50 which traverses the wing fold axis 44. The flexible shaft is driven at its input end 52 by a step-up transmission 54 which is mounted on the inboard wing section 12. The flexible shaft 50 has an output end 56 which drives a step-down transmission 58 on the outboard wing section 14. The step-up transmission 54 is driven by the inboard torque tube 32 while the step-down transmission 58 drives the outboard torque tube 34. In this way, constant power can be transmitted across the wing fold axis 44 at a relatively low torque because the rotational velocity of the flexible shaft 50 is substantially greater than the rotational velocity of the inboard or outboard torque tubes 32, 34. As a result, flexible shaft 50 can be relatively thin and flexible, to accommodate the complex, compound motion which occurs when the outboard wing section 14 is folded with respect to the inboard wing section 12.

The flexible shaft 50 is of the type having a flexible inner cable rotatable mounted within a flexible outer sheath. The cable has a preferred diameter of approximately 3/16 inch. The ability of flexible cables of this type to transmit torque is directly related to the thickness of the cable. Furthermore, the flexibility of such cables are inversely related to their thickness. Therefore, by stepping up the rotational speed of the flexible shaft 50, a relatively thin cable can be used which can also flex sufficiently to follow the complex, compound path between the inboard and outboard torque tubes 32, 34 when the wing sections 12, 14 are folded.

Overheating is a primary cause of failure in cables of this type. It is well known, relatively thick cables generated substantial heat when they are flexed while operating. Therefore, it is highly desirable that the flexible shaft be as thin as possible to both follow the complex, compound path described above and to reduce frictional heating within the cable.

Figure 3:
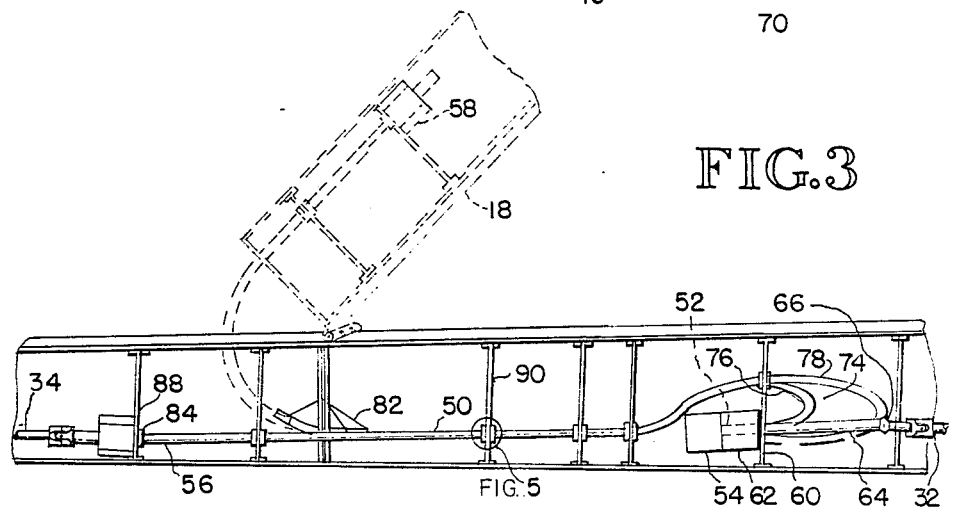
FIG. 3 is an enlarged, sectional elevational view of the flexible rotary coupling with the wing in folded and unfolded positions.
Figure 4:
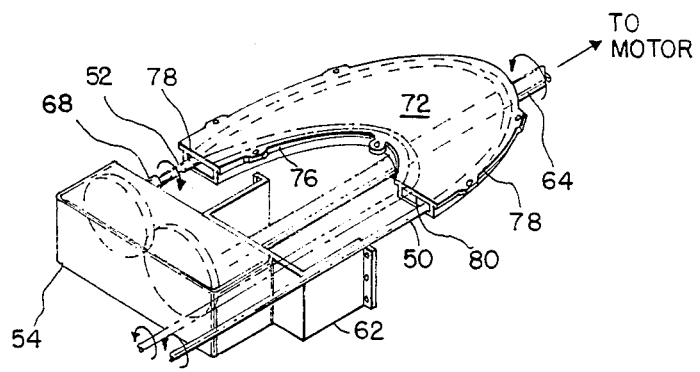
FIG. 4 is an enlarged, isometric view of the step up transmission and cable guide tray.

As is best shown in FIGS. 2, 3, and 4 the step-up transmission 54 is mounted within the inboard wing section 12 to a rib 60 or other structural element by a mounting plate 62. The inboard torque tube 32 is connected to a step-up transmission input shaft 64 by universal joint 66. The step-up transmission 54 has an output shaft 68 which counterrotates with respect to an input shaft 69 so that the output end 56 of the flexible shaft 50 rotates in the same direction as does the inboard torque tube 32. The step-up transmission has gears which provide a step-up gear ratio of approximately twelve to one, that is, the output shaft 68 undergoes approximately twelve revolutions for every single revolution of the input shaft 69.

As is apparent from inspecting FIG. 3, the path followed by the flexible shaft 50 between the step-up transmission 54 and step-down transmission 58 is greatest when the outboard wing section 18 is folded. As a result, an excess length of flexible shaft is present when the outboard wing section is unfolded. To support this excess length of flexible shaft when the outboard wing section is unfolded, a guide tray 70 is provided. The guide tray has a top 72, bottom 74, and sides 76, 78 which define an enclosed crescent having openings 78, 80 for movement of the flexible shaft 50 there through. The guide tray is supported from the rib 60 by bolts or other fastening mechanisms.

As shown in FIG. 4, the flexible shaft 50 assumes the phantom position when the outboard wing section 18 is folded, and the solid line position when the outboard wing section is unfolded. The guide tray 70 isolates the extra flexible shaft length from wiring, fuel lines, etc. which may be present in the wing and which might interfere with movement of the flexible shaft. However, the output end 56 of the flexible cable rotates in the same direction as the inboard torque tube 32. The flexible shaft 50 follows a 180° curved path through the guide tray 70. The output end 56 of the flexible cable thus counter-rotates with respect to the input end 52.

The inboard wing section 12 is also provided with a curved fairlead 82 which maintains a minimum radius of curvature of approximately five inches for the flexible shaft 50 when the outboard wing section 14 is folded as shown in FIG. 3. It has been found that with an inner cable diameter of approximately 3/16 inch a minimum radius of curvature of approximately five inches prevents a binding or excessive heating of the cable within the sheath.

The output end 56 of the flexible shaft 50 is connected to an input 84 of the step down transmission 58. The step down transmission 58 preferably has a gear ratio which is a reciprocal of the gear ration for the step up transmission 54. That is, for every twelve revolutions of the input 84, the step down transmission has an output 86, connected to the outboard torque tube 34, which revolves once. The step down transmission 58 is mounted within the outboard wing section such as to a rib 88 by any conventional fastener.

Figure 5:
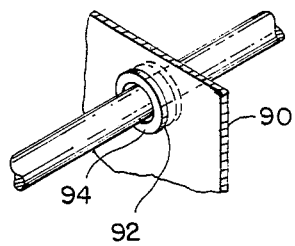
FIG. 5 is an enlarged view of circled area 4 in FIG. 3 illustrating an aperture in a rib of the wing with the flexible shaft passing therethrough.

To facilitate movement of the flexible cable through various ribs intermediate to ribs 60, 88 such as intermediate rib 90, apertures 92 having bearing collars 94 are provided. As shown in FIG. 5, the bearing collars 94 comprise an annular ring of flow friction material such as nylon to prevent chaffing of flexible shaft 50.

Other embodiments and variations of the invention are contemplated. Therefore, the invention is not to be limited by the above description, but is to be determined in scope by the claims which follow.

I claim:

1. A flexible rotary coupling for transmitting power across a wingfold axis on a folding wing aircraft, having wings formed by an inboard section pivotally connected to an outboard section so as to be pivotable about the wingfold axis, each of said wings having coordinated, moveable airflow control surfaces on each section driven by respective inboard and outboard torque transmitting members operable at a predetermined rotational speed and torque, comprising:
    a step-up transmission having an input shaft connected for rotation with one of said inboard torque transmitting members, said transmission further including an output shaft having a rotational velocity which is a multiple of the rotational velocity of said input shaft;
    a step-down transmission having an output shaft connected for rotation with one of said outboard torque transmitting members and an input shaft, said output shaft having a rotational velocity which is a fraction of the step-up transmission output shaft rotational velocity; and
    a flexible shaft having an input end connected for rotation with said output shaft of said step-up transmission, said flexible shaft further having an output end connected for rotation with the input shaft of said step-down transmission, whereby substantial rotational power can be transferred through the flexible shaft during wingfolding and unfolding operations because of the relatively small diameter and substantial flexibility of said flexible shaft.

2. The coupling of claim 1 wherein the flexible shaft has a flexible inner cable rotatably mounted within a flexible outer sheath.

3. The coupling of claim 2 wherein the flexible inner cable has a diameter of approximately 3/16 inch.

4. The coupling of claim 1 wherein the step-up transmission rotational velocity multiple and step-down transmission rotational velocity fraction are reciprocals, whereby the inboard torque transmitting member and outboard torque transmitting member rotate at the same speed.

5. The coupling of claim 4 wherein the step-up transmission rotational velocity multiple is approximately 12.0 and wherein the step-down rotational velocity fraction is approximately 0.083.

6. The coupling of claim 1 for use on a folding wing aircraft of the type wherein the inboard and outboard torque transmitting members define a drive axis substantially transverse to and displaced from the wingfold axis, wherein the step-up transmission is located on the inboard wing section and the step-down transmission is located on an outboard wing section, and wherein the flexible shaft has a length sufficient to bridge a gap formed between the step-up transmission output shafts and step-down transmission input shafts when the wing is folded, resulting in an excess length of flexible shaft being present when the wing is unfolded.

7. The coupling of claim 6 including guide means for guiding the excess flexible shaft length into and out of the inboard wing section.

8. The coupling of claim 7 wherein the guide means includes a substantially enclosed guide tray.

9. The coupling of claim 6 including a fairlead on the inboard wing section to maintain at least a minimum radius of curvature for the flexible shaft when the wing is folded.

10. The coupling of claim 9 wherein the fairlead has a curved section having a radius of curvature of approximately 5 inches.

11. The coupling of claim 9 wherein the flexible shaft has an inner flexible cable having a diameter of approximately 3/16 inch.

12. The coupling of claim 9 wherein the fairlead has a curved section defining a minimum bend radius for the flexible shaft, wherein the flexible shaft has a predetermined diameter, and wherein a minimum bend radius to predetermined flexible shaft diameter ratio is approximately 25:1.

13. A flexible rotary coupling for transmitting power across a wingfold axis of a folding wing aircraft, comprising:
    an inboard wing section having an inboard, moveable airflow control surface driven by an inboard torque transmitting member operable at a predetermined rotational speed and torque;
    an outboard wing section, pivotally connected to the inboard wing section about a wingfold axis, said outboard wing section having an outboard, moveable airflow control surface driven by an outboard torque transmitting member, wherein the inboard and outboard torque transmitting members define a drive axis substantially transverse to and displaced from the wingfold axis;
    a step-up transmission having an input shaft connected for rotation with said inboard torque transmitting member, said step-up transmission further having an output shaft having a rotational velocity which is a multiple of the rotational speed of the inboard torque transmitting member;
    a step-down transmission having an input shaft and an output shaft, the output shaft being connected for rotation with said outboard torque transmitting member, said step-down transmission output shaft also having a rotational velocity which is a fraction of the rotational velocity of the output shaft of said step-up transmission; and
    a flexible shaft having an input end connected for rotation with the output shaft of said step-up transmission and an output end connected for rotation with the input shaft of said step-down transmission, whereby substantial rotational power can be transferred through the flexible shaft during wingfolding and unfolding operations because of the relatively small diameter of said flexible shaft.

14. The coupling of claim 13 including guide means for guiding portions of the flexible shaft into and out of one of the wing sections.

15. The coupling of claim 13 including a fairlead on the inboard wing section to maintain at least a minimum radius of curvature for the flexible shaft when the wing is folded.

16. the coupling of claim 15 wherein the fair lead has a curved section defining a minimum bend radius for the flexible shaft, wherein the flexible shaft includes a flexible cable having a predetermined diameter, and wherein a minimum bend radius to predetermined flexible cable diameter ratio is approximately 25:1.

17. The coupling of claim 13 wherein the step-up transmission rotational velocity multiple and step-down transmission rotational velocity fraction are reciprocals whereby the inboard torque transmitting member and outboard torque transmitting member rotate at the same speed.

18. A method for transferring rotary power across a wing fold axis of a folding wing aircraft of the type having inboard wing sections pivotally connected to outboard wing sections so as to be pivotable about a wingfold axis, each of said wings having coordinated, movable airflow control surfaces on each section driven by respective inboard and outboard torque transmitting members operable at a predetermined rotational speed and torque, comprising the following steps:

increasing the rotational speed of the inboard torque transmitting member at an output thereof with a step-up transmission on the inboard wing section;

transferring rotary power across the wingfold axis at the increased rotational speed with a flexible shaft attached to the step-up transmission;

decreasing the rotational speed of an output end of the flexible shaft with a step-down transmission on the outboard wing section; and driving an outboard torque transmitting member with the step-down transmission.

19. The method of claim 18 for use on a folding wing aircraft of the type wherein the inboard and outboard torque transmitting members define a drive axis substantially transverse to and displaced from wingfold axis, including the step of guiding the flexible shaft into and out of the inboard wing section during wing unfolding and folding.

* * * * *

UNITED STATES PATENT AND TRADEMARK OFFICE
CERTIFICATE OF CORRECTION

PATENT NO. : 4,779,820

DATED : October 25, 1988

INVENTOR(S) : Neville E. Lambert

It is certified that error appears in the above-identified patent and that said Letters Patent is hereby corrected as shown below:

In claim 1, column 5, line 40, delete "the" and substitute therefor --a--.

Signed and Sealed this

Eleventh Day of April, 1989

Attest:

DONALD J. QUIGG

Attesting Officer

Commissioner of Patents and Trademarks